(12) United States Patent
Daga et al.

(10) Patent No.: US 7,046,076 B2
(45) Date of Patent: May 16, 2006

(54) HIGH EFFICIENCY, LOW COST, CHARGE PUMP CIRCUIT

(75) Inventors: Jean-Michel Daga, Rousset (FR); Emmanuel Racape, Aix en Provence (FR)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 10/810,033

(22) Filed: Mar. 26, 2004

(65) Prior Publication Data

US 2005/0212586 A1    Sep. 29, 2005

(30) Foreign Application Priority Data

Dec. 19, 2003    (FR) .................................. 03 15119

(51) Int. Cl.
*G05F 1/10* (2006.01)
*G05F 3/02* (2006.01)

(52) U.S. Cl. ..................................... 327/536

(58) Field of Classification Search ............... 327/536, 327/589; 363/59–60
See application file for complete search history.

(56) References Cited

U.S. PATENT DOCUMENTS

| | | | |
|---|---|---|---|
| 4,581,546 A | 4/1986 | Allan ......................... | 307/297 |
| 5,196,996 A | 3/1993 | Oh ............................. | 363/60 |
| 5,352,936 A | 10/1994 | Allen ......................... | 307/304 |
| 5,546,296 A | 8/1996 | Savignac et al. ............ | 363/60 |
| 5,818,289 A | 10/1998 | Chevallier et al. .......... | 327/536 |
| 5,874,850 A | 2/1999 | Pulvirenti et al. .......... | 327/536 |
| 5,889,428 A | 3/1999 | Young ........................ | 327/536 |
| 6,130,574 A | 10/2000 | Bloch et al. ................ | 327/536 |
| 6,163,487 A | 12/2000 | Ghilardelli ............. | 365/189.09 |
| 6,166,585 A | 12/2000 | Bazzani ...................... | 327/536 |
| 6,353,356 B1 | 3/2002 | Liu ............................. | 327/536 |
| 6,429,723 B1 | 8/2002 | Hastings ...................... | 327/536 |
| 6,437,637 B1 | 8/2002 | Myono ......................... | 327/536 |
| 6,448,841 B1 | 9/2002 | Milazzo ........................ | 327/536 |
| 6,466,079 B1 | 10/2002 | Kushnarenko ............... | 327/536 |
| 6,515,535 B1 | 2/2003 | Myono ......................... | 327/536 |

(Continued)

OTHER PUBLICATIONS

Article entitled "*A New High Efficiency CMOS Voltage Doubler*" by Pierre Favrat et al., Swiss Federal Institute of Technology Electronics Labs EL-LEG, Ecublens, CH-1015 Lausanne, Switzerland and Mead Microelectronics Engineering Applications and Design SA, Venoge 7, CH-1025 St. Sulpice, Switzerland, IEEE 1997 Custom Integrated Circuits Conference, pp. 259-262 (0-7803-3669-0).

(Continued)

*Primary Examiner*—Quan Tra
(74) *Attorney, Agent, or Firm*—Schneck & Schneck; Thomas Schneck

(57) ABSTRACT

The present invention features use of PMOS devices to realize switches of an integrated circuit charge pump, while maintaining a maximum voltage drop (lower than VDD) on each transistor. The charge pump includes a pumping capacitor connected to a pumping node, a first PMOS device connected to an input node, a second PMOS device connected to an output node, a third PMOS device electrically communicating with the first PMOS device, and an auxiliary capacitor connected to the first PMOS device. The first PMOS device is configured to connect the pumping node to the input node when the pumping capacitor is not boosted. The second PMOS device is configured to transfer electrical current from the pumping node to the output node when the pumping capacitor is not boosted.

16 Claims, 4 Drawing Sheets

U.S. PATENT DOCUMENTS

| | | | |
|---|---|---|---|
| 6,677,806 B1* | 1/2004 | Bloch | 327/536 |
| 6,734,717 B1* | 5/2004 | Min | 327/536 |
| 2002/0114199 A1 | 8/2002 | Negoi | 365/200 |
| 2002/0122324 A1* | 9/2002 | Kim et al. | 363/59 |
| 2002/0125935 A1* | 9/2002 | Sawada et al. | 327/536 |
| 2002/0190780 A1 | 12/2002 | Bloch | 327/536 |
| 2004/0104761 A1* | 6/2004 | Yen | 327/536 |

OTHER PUBLICATIONS

S-C Lee et al., *A Low-Ripple Switched-Capacitor DC—DC up Converter for Low-Voltage Applications*, IEICE Transactions on Elect., Instit. Electronics Information and Comm. Eng., Aug. 2001, vol. E84-C, No. 8, pp. 1100-1103, XP001107649, ISSN 0916-8524.

K-S Min et al., *CMOS Charge Pumps Using Cross-Coupled charge Transfer Switches with Improved Voltage Pumping Gain and Low Gate-Oxide Stress for Low-Voltage Memory Circuits*, IEICE Transactions on Electron., Instit. Electronics Information and Comm. Eng., Jan. 2002, vol. E85-C, No. 1, Jan. 2002, XP001116786,ISSN 0916-8524.

Hongchin Lin et al., "New Four-Phase Generation Circuits for Low-Voltage Charge Pumps", IEEE, 2001, pp. 504-507.

* cited by examiner

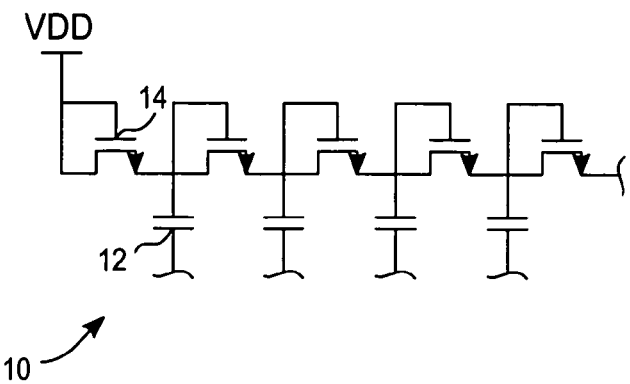
Fig._1 (PRIOR ART)
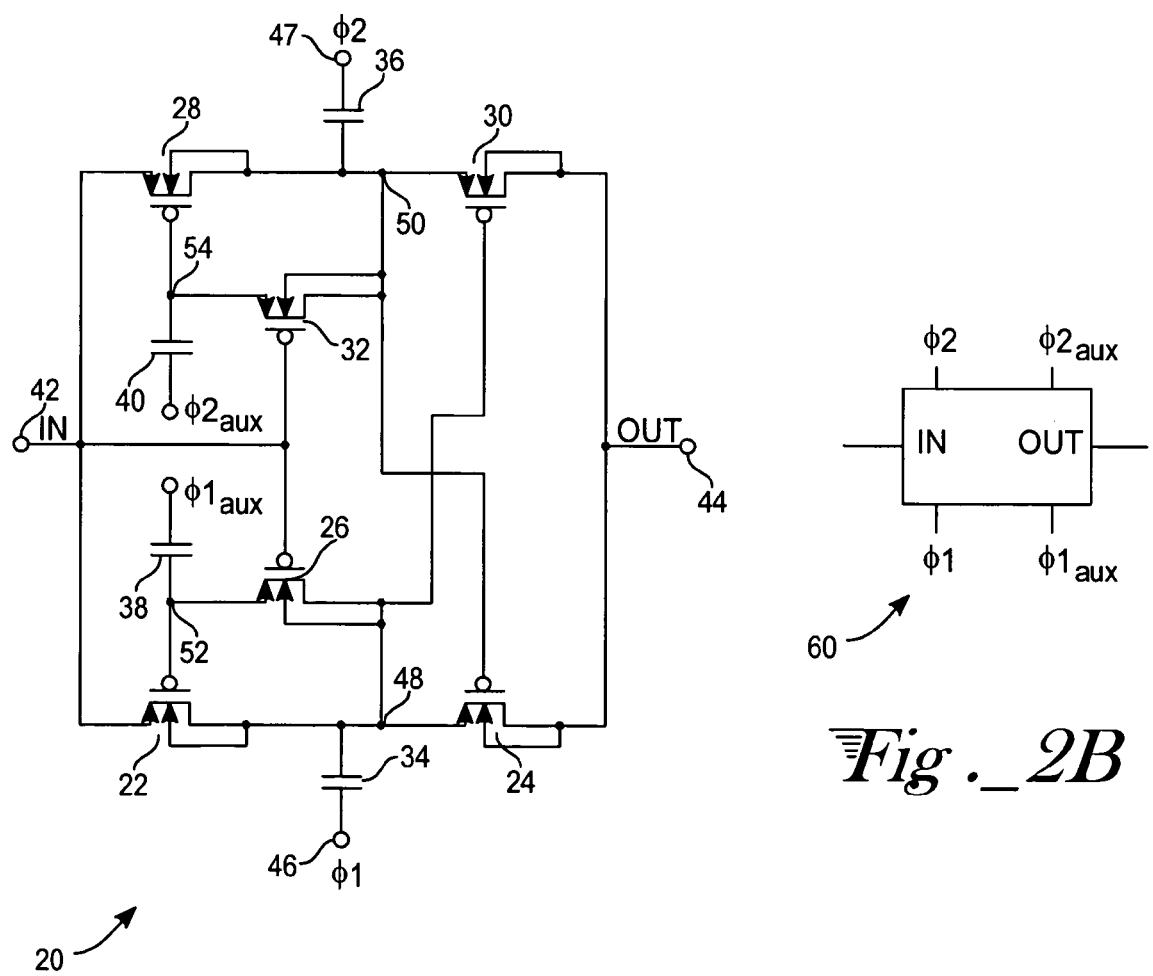
Fig._2A
Fig._2B

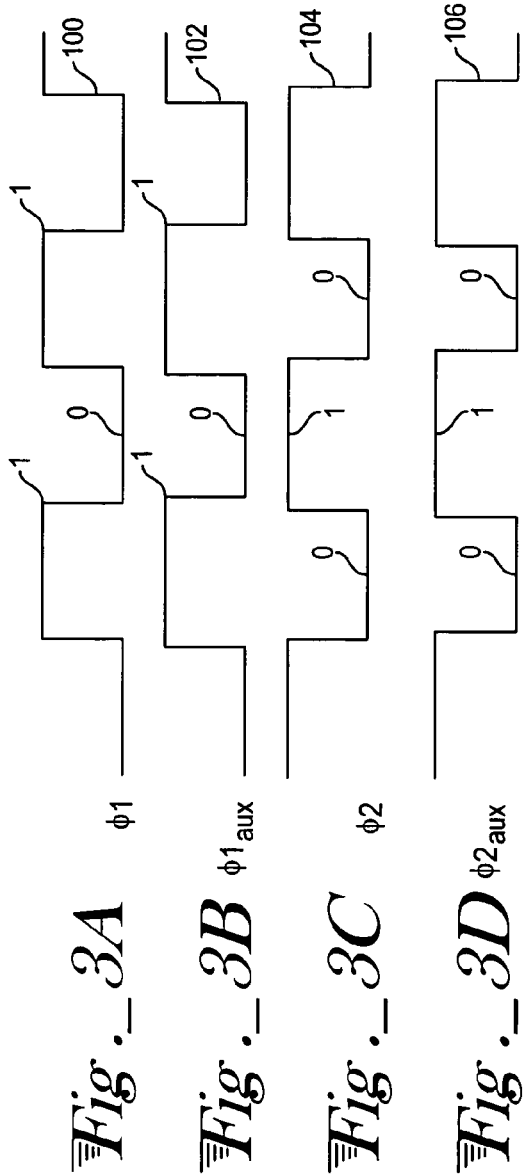
Fig._3A  φ1
Fig._3B  φ1aux
Fig._3C  φ2
Fig._3D  φ2aux
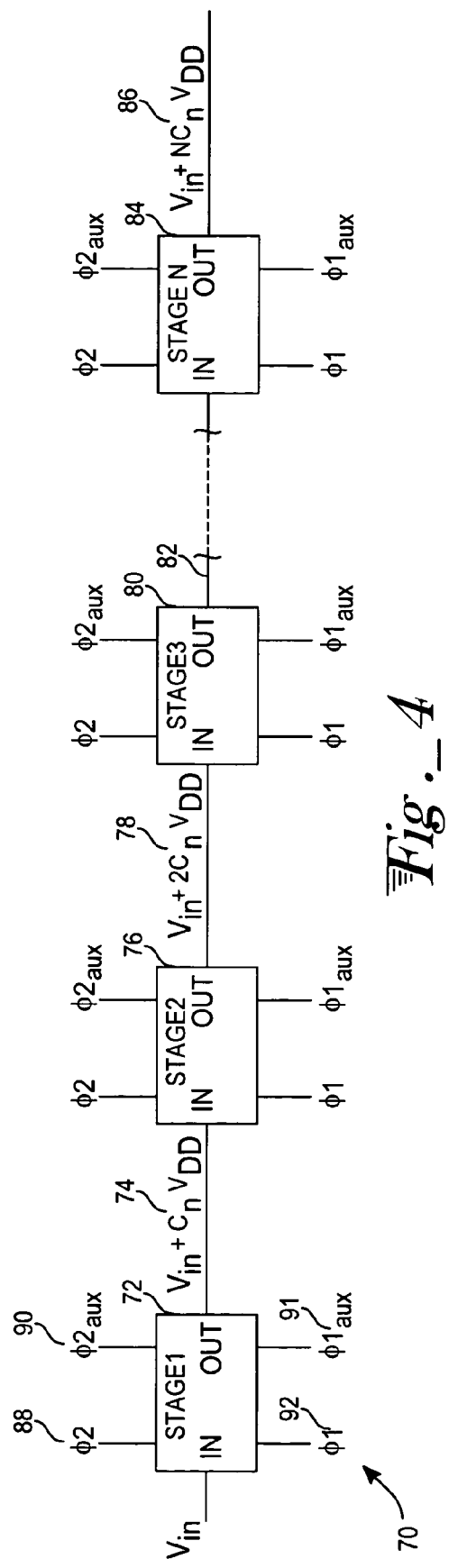
Fig._4

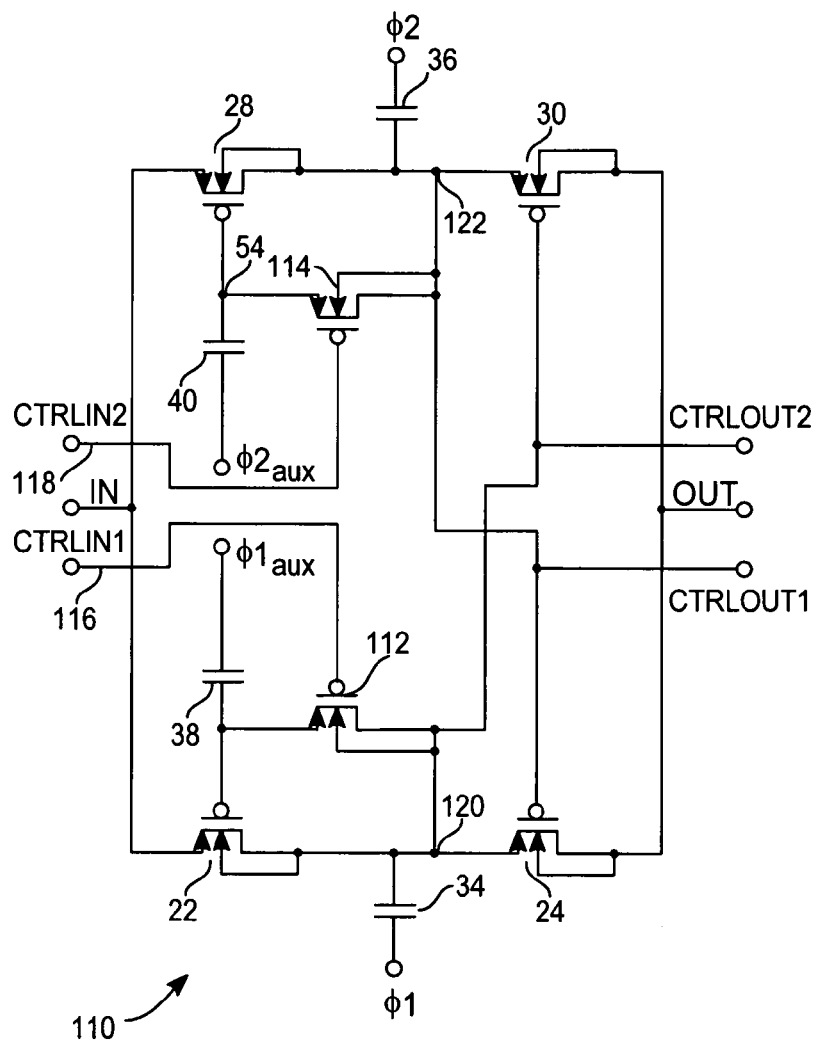
Fig._5A
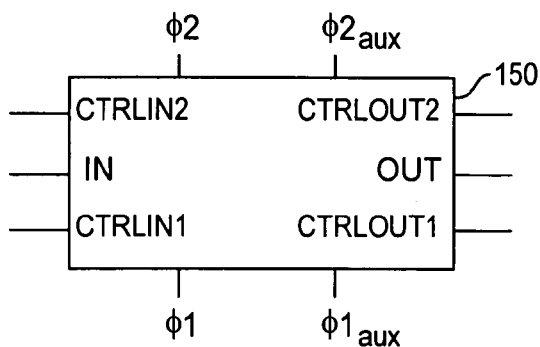
Fig._5B

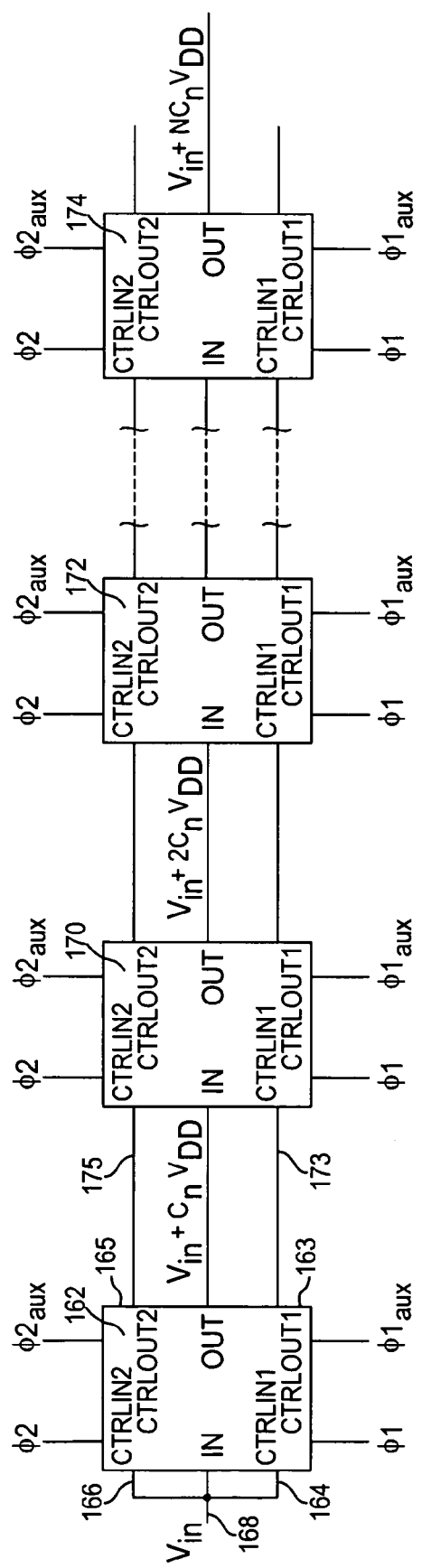
Fig._6

HIGH EFFICIENCY, LOW COST, CHARGE PUMP CIRCUIT

TECHNICAL FIELD

The present invention relates to the field of the integrated circuit design, and more specifically, to the field of charge pump circuits.

BACKGROUND ART

Charge pump circuits are frequently used in semiconductor integrated circuits to provide a voltage that is higher than the voltage of a power supply, often a battery, or a voltage of reverse polarity. These circuits are particularly useful in flash and EEPROM non-volatile memories, but are gaining more and more acceptance in analog circuits in order to increase dynamic range and simplify circuit design. One of the most popular charge pump circuits is the Dickson charge pump 10, shown in FIG. 1 wherein switched capacitor multi-stage circuitry is featured. Each stage is made of a capacitor 12 and an NMOS type transistor 14 acting as a diode. These transistors have their bulk or substrate connected to ground, their drain and gate connected together to the stage capacitor, and their source connected to the capacitor of the next stage. Two inverted phase clocks, not shown, are used for pumping charge from stage to stage. The maximum gain per stage of the Dickson charge pump 10 is (VDD−VT), where VT is the threshold voltage of an NMOS device.

For some applications, the Dickson charge pump 10 has a number of drawbacks. For instance, the number of stages that can be cascaded is limited by the amount of the voltage drop increase between the source and the bulk of an NMOS device resulting in a dramatic VT increase on the last stages. Another significant drawback is that thick oxide, high voltage dedicated transistors are necessary to sustain a large voltage drop between gate and bulk in a reliable way. This makes it impossible to design Dickson charge pumps using thin oxide, low voltage standard devices which can sustain a maximum drop of VDD.

Many improvements to the basic Dickson structure have been made to overcome the gain degradation due to threshold voltage described above. Among the large number of proposed solutions, the four phase charge pump structure disclosed by Hongshin Lin and Nai-Hsein Chen in the paper "New Four-Phase Generation Circuits for Low-Voltage Charge Pumps," published in the Proc. ISCAS' 2001, stands out as a very efficient approach to prevent gain degradation due to the threshold voltage. For example, a 9V output voltage was obtained by using a ten stage pump, starting from 1V power supply. However, this approach is not feasible for a standard CMOS process. Another solution involves overcoming the gain degradation due to threshold voltage by using low voltage transistors, is disclosed in the U.S. Pat. No. 5,874,850, issued to Pulvirenti. The '850 patent uses a two phase clocking scheme and NMOS devices with triple well technology. Triple well processes require additional masking and etching steps compared to the standard CMOS process. An object of the invention is to achieve a high efficiency charge pump overcoming drawbacks of the prior art.

SUMMARY OF THE INVENTION

The above object has been achieved with a charge pump having improved gain per stage achieved by limiting the influence of threshold voltage and body effect. The present invention features use of PMOS devices to realize switches of an integrated circuit charge pump because the limitations of prior NMOS transistors due to threshold voltage drop and body effect are not present with PMOS switches. Moreover, the voltage difference between all the nodes of PMOS devices never exceeds VDD on the charge pump of the present invention. That way, the thick gate oxide needed for triple wells and N-wells in general is not needed on the charge pump of the present invention. The gain per stage of the charge pump structure of the present invention is very close to VDD and is limited only by parasitics. A charge pump structure of the present invention has a pumping capacitor connected to a pumping node, a first PMOS device connected to an input node, a second PMOS device connected to an output node, a third PMOS device electrically communicating with the first PMOS device, and an auxiliary capacitor connected to the first PMOS device. In this embodiment, the first PMOS device electrically communicates with the pumping capacitor and is configured to connect the pumping node to the input node when the pumping capacitor is not boosted. The second PMOS device electrically communicates with the pumping capacitor and is configured to transfer electrical current from the pumping node to the output node when the pumping capacitor is boosted. At the same time, the second PMOS device is configured to prevent a reversal current feedback from the output node to the pumping node when the pumping capacitor is boosted. The third PMOS device is configured to switch a gate of the first PMOS device to a boosted pump node potential in order to prevent the current feedback from the pumping node to the in put node when the pumping capacitor is boosted. The auxiliary capacitor is configured to generate an under-shoot on the gate of the first PMOS device and to switch the apparatus to an "ON" state when an electrical current is transferred from the input node to the pumping node.

In another embodiment of the present invention, the charge pump stage comprises a symmetrical charge pump stage structure further comprising a first substructure and a second substructure. Each substructure may further comprise a charge pump structure described above.

In a further embodiment of the present invention, the apparatus for generating a supply voltage internally within an integrated circuit comprises an independently controlled charge pump stage having an input control node, a pumping capacitor connected to a pumping node, a first PMOS device connected to the input control node, a second PMOS device connected to an output control node, and a third PMOS device electrically communicating with the first PMOS device. In this embodiment, the first PMOS device electrically communicates with the pumping capacitor and is configured to connect the pumping node to the input control node when the pumping capacitor is not boosted. The second PMOS device electrically communicates with the pumping capacitor and is configured to transfer electrical current from the pumping node to the output control node when the pumping capacitor is boosted. The second PMOS device is configured to prevent a reversal current feedback from the output control node to the pumping node when the pumping capacitor is not boosted, and the third PMOS device is configured to switch a gate and the third PMOS device to a boosted pump node potential in order to prevent the current feedback from the pumping node to the input control node when the pumping capacitor is boosted. Each substructure further comprises an auxiliary capacitor connected to the first PMOS device. The auxiliary capacitor is configured to generate an under-shoot on the gate of the first PMOS device, and configured to switch the apparatus to an "ON" state when an electrical current is transferred from the input control node to the pumping node.

In an additional embodiment of the present invention, the apparatus for generating a supply voltage internally within an integrated circuit comprises an independently controlled symmetrical charge pump stage structure having a first independently controlled substructure and a second independently controlled substructure. Each independently controlled substructure further comprises a charge pump structure described above.

In yet another embodiment of the present invention, an apparatus for generating a supply voltage internally within an integrated circuit comprises a plurality of symmetrical charge pump stages cascade-connected in series further with a first symmetrical pump charge stage connected to an input node, a last symmetrical pump charge stage connected to an output node, and, preferably but not necessarily, at least one intermediate symmetrical pump charge stage therebetween. In this embodiment, each symmetrical pump charge stage further comprises a first substructure and a second substructure each of which may be a charge pump structure as described above.

In a still further embodiment of the present invention, an apparatus for generating a supply voltage internally within an integrated circuit comprises a symmetrical pump charge stage connected to an input node, with a plurality of independently controlled symmetrical charge pump stages cascade-connected in series. The plurality of independently controlled symmetrical charge pump stages cascade-connected in series further comprises a first independently controlled symmetrical pump charge stage connected to the symmetrical pump charge stage, a last independently controlled symmetrical pump charge stage connected to an output node, and at least one intermediate independently controlled symmetrical pump charge stage therebetween. Each independently controlled symmetrical pump charge stage pump charge stage has a first independently controlled substructure and a second independently controlled substructure that each may feature an independently controlled charge pump structure described above.

BRIEF DESCRIPTION OF DRAWINGS

FIG. 1 is a simplified circuit diagram of a prior art Dickson charge pump.

FIG. 2A is a circuit diagram of a symmetrical single stage charge pump of the present invention.

FIG. 2B is a block representation of the single stage charge pump of FIG. 2.

FIGS. 3A–3D are clocking schemes that describe operation of the single charge pump stage of FIG. 2A during one period.

FIG. 4 is a circuit diagram of an N-stage charge pump structure of the present invention using cascading basic stages of FIG. 2B.

FIG. 5A is a circuit diagram of an alternate embodiment of the present invention, namely, an independently controlled single charge pump stage.

FIG. 5B is a block representation of the independently controlled single charge pump stage of FIG. 5A.

FIG. 6 shows a multi-stage charge pump structure that utilizes the independently controlled single charge pump stage of FIG. 5B.

DETAILED DESCRIPTION

With reference to FIG. 2A, the symmetrical single stage charge pump 20 includes 6 low voltage PMOS devices 22, 24, 26, 28, 30, and 32, two boosting capacitors 34 and 36 and two auxiliary capacitors 38 and 40. Each symmetrical charge pump 20 device includes two equivalent substructures, namely a first charge pump substructure and a second charge pump substructure. The first substructure has 3 low voltage PMOS devices 22, 24, and 26, a single boosting capacitor 34, and a single auxiliary capacitor 38; whereas the second substructure includes 3 low voltage PMOS devices 28, 30, and 32, a single boosting capacitor 36, and a single auxiliary capacitor 40. The first charge pump substructure and the second charge pump substructure may be identically sized.

Briefly, assuming that an input voltage Vin is applied at the input node 42, the basic operation of the pump stage 20 components can be described using a single charge pump substructure as follows. Boosting capacitor 34 of the first substructure or boosting capacitor 36 of the second substructure is a large coupling capacitor used for the basic charge pumping operation. Either the PMOS device 24 of the first substructure or PMOS device 30 of the second substructure is used to transfer charge from the node 48 of the first substructure (or from the node 50 of the second substructure) to the output node 44, and to prevent a reversal current feedback from the output node 44 to either of the pumping nodes 48 and 50.

PMOS device 22 of the first substructure or PMOS device 28 of the second substructure is used to connect the pumping node boosting capacitor 34 device of the first substructure, or the boosting capacitor 36 of the second substructure to the input voltage Vin applied to the input node 42 when boosting capacitor 34 of the first substructure or boosting capacitor 36 of the second substructure is not pumped. Boosting capacitor 34 of the first substructure or boosting capacitor 36 of the second substructure is not pumped when the pumping potential of the first substructure or when the pumping potential of the second substructure is low. FIG. 2B simplifies consideration of inputs and outputs of FIG. 2A.

Referring again to FIG. 2A, PMOS device 26 of the first substructure or PMOS device 32 of the second substructure is used to switch the gate of PMOS device 22 of the first substructure or PMOS device 28 of the second substructure to the boosted pump node potential (by connecting pumping nodes 48 or 50 to the gate of PMOS devices 22 or 28) in order to prevent reversal current feedback to the input when boosting capacitor 34 of the first substructure or boosting capacitor 36 of the second substructure is boosted. Auxiliary small capacitor 38 of the first substructure auxiliary small capacitor 40 of the second substructure is used to generate an undershoot on the gate of PMOS device 22 of the first substructure or PMOS device 28 of the second substructure and have this device ON when the charge is transferred from the input node 42 to the node 48 of the first substructure or to the node 50 of the second substructure.

In a steady state, a net-pumping node potential at the net-pumping node 48 of the first substructure varies in the following range:

$$V \text{ net-pumping node} \subseteq [Vin;\ Vin + Cr1 * VDD];\qquad\text{(Eq. 1)}$$

where $Cr1 = 1/(1 + Cpar1/Cpump1)$, Vin is the input voltage and Cpump1 is the capacitance of boosting capacitor 34.

In general, Cpar1 is the total parasitic capacitance at node 48, due to devices 22, 24, 26, and 30 from both the first and the second substructures as well as net routing.

However, assuming that Cpump1>>Cpar1, Cr1 is very close to 1. This results in the following approximate range of variation for the net-pumping node potential at the net-pumping node 48 of the first substructure:

$$V \text{ net-pumping node} \subseteq [Vin;\ Vin+VDD]. \quad \text{(Eq. 2)}$$

In this approximation, the parasitic capacitance at node 48 is negligibly small.

Referring still to FIG. 2A, the potential at the auxiliary node 52 of the first substructure or the potential at the auxiliary node 54 of the second substructure switches to Vin+VDD during the pumping period of the first net-pumping node 48 of the first substructure, or during the pumping period of the second net-pumping node 50 of the second substructure, due to the fact that during the pumping period of the first net-pumping node 48 of the first substructure, or during the pumping period of the second net-pumping node 50 of the second substructure, the PMOS device 26 of the first substructure is ON, or due to the fact that PMOS device 32 of the second substructure is ON.

At the end of the pump operation, potential Φ1 at the node 46 of the first substructure, or potential Φ2 at the node 47 of the second substructure, goes low, and the potential at the node 48 of the first substructure, or the potential at the node 50 of the second substructure, as well as the potential at the node 52 of the first substructure, or the potential at the node 40 of the second substructure decreases to the input potential Vin. At this point in time, the potential Φ1aux at the auxiliary capacitor 38 of the first substructure or, the potential Φ2aux at the auxiliary capacitor 40 of the second substructure, switches low to drive the auxiliary node netaux1 (netaux2) below the input potential Vin, thus turning device 22 of the first substructure ON or, turning device 28 of the second substructure ON.

The potential Vlow at node netaux1 52 of the first substructure during the under-shoot is equal to:

$$Vlow = Vin - Cr2*VDD; \quad \text{(Eq. 3)}$$

where Cr2=1/1+Cpar2/Caux1), and Cpar2 is the total parasitic capacitance at node netaux1 52 due to device 22 and device 26.

The following condition has to be satisfied to achieve a correct functionality of the charge pump stage 20 of FIG. 2A:

$$Cr2*VDD > Vt; \quad \text{(Eq. 4)}$$

where Vt is the threshold voltage of the P device.

With reference to FIGS. 3A–3D, the clocking schemes shown provide a description of the operation of the single charge pump stage 20 of FIG. 2A during one period, based on functioning of both the first and the second substructures of the single pump stage 20 of FIG. 2A. The following initial conditions are assumed: Φ1 (100 of FIG. 3A) is low, Φ1aux (102 of FIG. 3B) is low, Φ2 (104 of FIG. 3C) is high, and Φ2aux (106 of FIG. 3D) is high. Therefore, the initial potentials at nodes netpump2 50, netaux2 54, netpump1 48, and netaux1 52 are as follows (assuming Cr1=1 for simplicity):

$$V \text{ netpump2} = V \text{net aux2} = Vin+VDD; \quad \text{(Eq. 5)}$$

$$V \text{netpump1} = Vin; \quad \text{(Eq. 6)}$$

$$V \text{netaux1} = Vlow. \quad \text{(Eq. 7)}$$

After the potential Φ1aux switches to VDD (102 of FIG. 3B), the potential at the netaux1 52 node rises from Vlow to Vin due to the voltage on auxiliary capacitor 38. Then the potential Φ1 (100 of FIG. 3A) switches to VDD, the potential at node 48 rises to Vin+VDD, as well as the potential at the node 52 which is connected to node 48 through device 26. At the next phase, the potential Φ2 goes low (104 of FIG. 3C), switching the potential at the node 50 to Vin, and switching the potential at the node 54 to Vin via device 32. At this point in time, the potential at the node 50 is low and is equal to Vin. As a result, device 24 turns ON and the charge transfer from the net-pumping node 48 to the output node 44 occurs. However, because device 22 and device 30 have potential on their gates equal to Vin+VDD, they are OFF and there is no reversal charge transfer.

During the last phase of the same period, Φ2aux (106 of FIG. 3D) goes low in order to switch the potential at the node netaux2 54 to Vlow. As a result, device 28 turns ON and transfers charge from the input node 42 to the node 50 which becomes the next pumped node.

Thus, to simplify the description, during the first half of the period, charge is transferred from the node 48 to the output node 44, and from the input node 42 to the node 50. When this charge transfer is completed, the symmetrical second half of the period starts by switching Φ2aux potential (106 of FIG. 3D) to the "high" state in order to make the potential at the node 54 rise from Vlow to Vin.

Then Φ2 potential (104 of FIG. 3C) goes high to boost the potential at the node 50 and to boost the potential at the node 54 to Vin+VDD. This follows by Φ1 potential (100 of FIG. 3A) going low to turn device 30 ON to start charge transfer from the node 50 to the output node 44.

Finally, the last phase includes switching Φ1aux potential (102 of FIG. 3B) to low in order to turn device 22 ON. During this second half period charge is now flowing from the input node 42 to the next pumped node 48, and from the pumped node 50 to the output node 44. A very important characteristic of the charge pump structure of the present invention is that the voltage drop between the four nodes of each device does not exceed VDD during the pump operation. Moreover, the bulk of the PMOS devices is always at the higher potential.

With reference to FIG. 4, an N-stage charge pump structure 70 is shown where N is an integer that can be obtained by cascading basic stages 60 of FIG. 2B. The gain per stage is limited only by parasitic capacitance and can be made very close to VDD. Assuming an N stage charge pump with Vin at the input, and if there is no current pulled at the output, the maximum output voltage is as follows:

$$\text{MAX } Vout = Vin + N*Cr1*VDD. \quad \text{(Eq. 8)}$$

EXAMPLE I

An output voltage of 10.6V can be obtained by using 10 stages of a charge pump structure of the present invention that employs 0.18 μm devices, with a power supply of 1V. This represents 96% of VDD average gain per stage for a 10-stage structure.

Another aspect of the present invention is directed to an independently controlled single charge pump stage 110 as illustrated in FIG. 5A and, in simplified block form, in FIG. 5B. The only difference between the independently controlled single charge pump stage 110 of the present invention as illustrated in FIG. 5A and the single charge pump stage 20 of the present invention as depicted in FIG. 2A is that device 112 and device 114 devices of FIG. 5A can be controlled independently by using control lines ctrlin1 116 and ctrlin2 118 as input signals.

FIG. 6 is a charge pump structure 160 that utilizes the basic stage 150 of FIG. 5B. The first stage 162 is identical to the basic stage 60 of FIG. 2B because input control signals ctrlin1 164 and ctrlin2 166 are connected to the input voltage Vin 168. Therefore, the first stage 162 cannot be independently controlled. However, each following charge pump stage 170, 172, 174, etc. can be independently controlled. Indeed, for instance, the charge pump stage 170 can be independently controlled because the input control signals ctrlin1 173 and ctrlin2 175 for the stage 170 are connected to the output signals ctrlout1 163 and ctrlout2 165 of the previous stage 162, that can be made independent from each other.

Referring still to FIG. 5A, during the pump operation on the node 120, the voltage difference between the drain and the gate of the device 112 is 2VDD, whereas the voltage difference between the drain and the gate of the device 26 of FIG. 2A is VDD. When the node 120 is not pumped, the voltage difference between the drain and the gate of the device 112 is the same as the voltage difference between the drain and the gate of the device 26 of FIG. 2A.

Similarly, during the pump operation on the node 122, the voltage difference between the drain and the gate of the device 114 is 2VDD, instead of the voltage difference of VDD between the drain and the gate of the device 32 of FIG. 2A. When the node 122 is not pumped, the voltage difference between the drain and the gate of the device 114 is the same as the voltage difference between the drain and the gate of the device 32 of FIG. 2A. A symmetrical effect is observed at node 120 involving device 112.

The charge pump structure 110 of FIG. 5A is perfectly functional, and has the same level of performance as the charge pump structure 20 of FIG. 2A. However, because the maximum voltage difference for device 112 and device 114 between their drain and gate during pumping operation is 2VDD, the charge pump stage 110 of FIG. 5A cannot be implemented by using low voltage, thin oxide PMOS devices. Instead, the charge pump stage 110 of FIG. 5A are implemented by using PMOS devices with thicker oxide for device 112 and device 114, while thin oxide PMOS devices can be used for the rest of the pump stage. In comparison, the charge pump stage 20 of FIG. 2A can be implemented using thin oxide PMOS devices only.

There are several main advantages of using the charge pump structures of the present invention depicted in FIG. 2A and FIG. 5A.

More specifically, both structures 20 (of FIG. 2A) and 110 (of FIG. 5A) of the present invention enjoy the optimal gain per stage because they do not experience degradation due to threshold voltage. Indeed, the gain per stage is limited by parasitics only. Both structures 20 (of FIG. 2A) and 110 (of FIG. 5A) of the present invention are perfectly suitable for low voltage operation. In addition, the charge pump stage of FIG. 2A is compatible with standard CMOS applications and may be made with thin oxide PMOS processes.

The invention claimed is:

1. An apparatus for generating a supply voltage internally within an integrated circuit comprising:

a charge pump stage structure having a pumping capacitor connected to a pumping node, a first PMOS device connected between an input node and said pumping node, said first PMOS device configured to electrically communicate with said pumping capacitor, wherein said first PMOS device is configured to connect said pumping node to said input node when said pumping capacitor is not boosted;

a second PMOS device connected between an output node and said pumping node, said second PMOS device configured to electrically communicate with said pumping capacitor, said second PMOS device configured to transfer electrical charge from said pumping node to said output node when said pumping capacitor is boosted, said second PMOS device having a gate terminal connected to a pumping node of another charge pump stage structure of a symmetrical charge pump, wherein said second PMOS device is configured to prevent reverse current feedback from said output node to said pumping node when said pumping capacitor is not boosted; and a third PMOS device configured to electrically communicate with said first PMOS device, wherein said third PMOS device is configured to connect said pumping node to a gate terminal of said first PMOS device to prevent current feedback from said pumping node to said input node.

2. The apparatus of claim 1, wherein said third PMOS device is configured to connect the pumping node to a gate terminal of said first PMOS device in order to prevent said current feedback from said pumping node to said input node when said pumping capacitor is boosted.

3. The apparatus of claim 1 further including:

an auxiliary capacitor connected to a gate terminal of said first PMOS device, wherein said auxiliary capacitor is configured to generate an undershoot on said gate of said first PMOS device, and wherein said auxiliary capacitor is configured to switch said first PMOS device to an "ON" state when an electrical current is transferred from said input node to said pumping node.

4. An apparatus for generating a supply voltage internally within an integrated circuit comprising:

a symmetrical charge pump stage structure comprising a first substructure and a second substructure, each of said substructures having a pumping capacitor connected to a pumping node, a first PMOS device connected between an input node and said pumping node, said first PMOS device configured to electrically communicate with said pumping capacitor; wherein said first PMOS device is configured to connect said pumping node to said input node when said pumping capacitor is not boosted;

each of said substructures having a second PMOS device connected between an output node and said pumping node, said second PMOS device configured to electrically communicate with said pumping capacitor, said second PMOS device configured to transfer electrical charge from said pumping node to said output node when said pumping capacitor is boosted, said second PMOS device configured to prevent a reversal current feedback from said output node to said pumping node when said pumping capacitor is not boosted, said second PMOS device having a gate terminal connected to a pumping node of the other substructure, wherein said second PMOS device is configured to prevent a reverse current, feedback from said output node to said pumping node when said pumping capacitor is not boosted; and each of said substructures having a third PMOS device configured to electrically communicate with said first PMOS device, wherein said third PMOS device is configured to connect said pumping node to a gate terminal of said first PMOS device to prevent the reverse current feedback from said pumping node to said input node when said pumping capacitor is boosted.

5. The apparatus of claim 4, wherein said third PMOS device is configured to switch the gate terminal of said first PMOS device to a boosted pump node potential in order to prevent said reverse current feedback from said pumping node to said input node when said pumping capacitor is boosted.

6. The apparatus of claim 4, wherein each said substructures further comprises:
an auxiliary capacitor connected to a gate terminal of said first PMOS device, wherein said auxiliary capacitor is configured to generate an undershoot on said gate of said first PMOS device, and wherein said auxiliary capacitor is configured to switch said first PMOS device to an "ON" state when an electrical current is transferred from said input node to said pumping node.

7. An apparatus for generating a supply voltage internally within an integrated circuit comprising:
an independently controlled charge pump stage having an input control node, a pumping capacitor connected to a pumping node, a first PMOS device connected between said input control node and said pumping node, said first PMOS device configured to electrically communicate with said pumping capacitor, wherein said first PMOS device is configured to connect said pumping node to said input control node when said pumping capacitor is not boosted;
a second PMOS device connected between an output control node and said pumping node, said second PMOS device configured to electrically communicate with said pumping capacitor, said second PMOS device configured to transfer electrical charge from said pumping node to said output control node when said pumping capacitor is boosted, said second PMOS device configured to prevent reverse current feedback from said output control node to said pumping node when said pumping capacitor is not boosted, said second PMOS device having a gate terminal connected to a pumping node of another charge pump stage of a symmetrical charge pump, wherein said second PMOS device is configured to prevent a reverse current feedback from said output node to said pumping node when said pumping capacitor is not boosted; and
a third PMOS device electrically communicating with said first PMOS device, wherein said third PMOS device is configured to connect said pumping node to a gate terminal of said first PMOS device to prevent reverse current feedback from said pumping node to said input control node when said pumping capacitor is boosted; wherein said third PMOS device has a gate terminal at which is provided a control signal for independently controlling said third PMOS device.

8. The apparatus of claim 7, wherein said third PMOS device is configured to switch a gate of said first PMOS device to a boosted pump node potential in order to prevent said reverse current feedback from said pumping node to said input control node when said pumping capacitor is boosted.

9. The apparatus of claim 7, further including:
an auxiliary capacitor connected to a gate terminal of said first PMOS device, wherein said auxiliary capacitor is configured to generate an undershoot on said gate of said first PMOS device, and wherein said auxiliary capacitor is configured to switch said first PMOS device to an "ON" state when an electrical current is transferred from said input control node to said pumping node.

10. An apparatus for generating a supply voltage internally within an integrated circuit comprising:
an independently controlled symmetrical charge pump stage structure comprising a first independently controlled substructure and a second independently controlled substructure, each of said independently controlled substructures having:
an input control node;
a pumping capacitor connected to a pumping node;
a first PMOS device connected to said input control node, said first PMOS device configured to electrically communicate with said pumping capacitor, wherein said first PMOS device is configured to connect said pumping node to said input control node when said pumping capacitor is not boosted;
a second PMOS device connected between an output control mode; said second PMOS device configured to electrically communicate with said pumping capacitor, said second PMOS device configured to transfer electrical current from said pumping node to said output control node when said pumping capacitor is boosted, said second PMOS device configured to prevent a reversal current feedback from said output control node to said pumping node when said pumping capacitor is not boosted, said second PMOS device having a gate terminal connected to a pumping node of the other substructure, wherein said second PMOS device is configured to prevent reverse current feedback from said output node to said pumping node when said pumping capacitor is not boosted; and
a third PMOS device configured to electrically communicate with said first PMOS device, wherein said third PMOS device is configured to connect said pumping node to a gate terminal of said first PMOS device to prevent reverse current feedback from said pumping node to said input control node when said pumping capacitor is boosted; wherein said third PMOS device has a gate terminal at which is provided a control signal for independently controlling said third PMOS device.

11. The apparatus of claim 10, wherein said third PMOS device is configured to switch a gate of said first PMOS device to a boosted pump node potential in order to prevent said reverse current feedback from said pumping node to said input control node when said pumping capacitor is boosted.

12. The apparatus of claim 10, wherein each of said independently controlled substructures further comprises:
an auxiliary capacitor connected to said first PMOS device, wherein said auxiliary capacitor is configured to generate an undershoot on said gate of said first PMOS device, and wherein said auxiliary capacitor is configured to switch said first PMOS device to an "ON" state when an electrical current is transferred from said input control node to said pumping node.

13. An apparatus for generating a supply voltage internally within an integrated circuit comprising:
a plurality of symmetrical charge pump stages cascade-connected in series having:
a first symmetrical pump charge stage connected to an input node;
a last symmetrical pump charge stage connected to an output node; and wherein each of said symmetrical pump charge stages further comprises a first substructure and a second substructure, each of said first and second substructures further comprises:
a pumping capacitor connected to a pumping node;
a first PMOS device connected between an input node and said pumping node, said first PMOS device configured to electrically communicate with said coupling capacitor, wherein said first PMOS device is configured to connect said pumping node to said input node when said pumping capacitor is not boosted;
a second PMOS device connected between an output node and said pumping node; said second PMOS device configured to electrically communicate with said pumping capacitor, said second PMOS device configured to transfer electrical charge from said pumping node to said output node when said pumping capacitor is boosted, said second PMOS device configured to prevent a reversal current feedback from said output node to said pumping node when said pumping capacitor is not boosted, said second PMOS device having a gate terminal connected to a pumping node of another charge pump stage structure of a symmetrical charge pump, wherein said second PMOS device is configured to prevent reverse current feedback from said output node to said pumping node when said pumping capacitor is not boosted; and
a third PMOS device configured to electrically communicate with said first PMOS device, wherein said third PMOS device is configured to connect said pumping node to a gate terminal of said first PMOS device to prevent the reverse current feedback from said pumping node to said input node when said pumping capacitor is boosted.

14. The apparatus of claim 13 further comprising;
at least one intermediate symmetrical pump charge stage between the first symmetrical pump charge stage connected to the input node and the last symmetrical pump charge stage connected to the output node.

15. An apparatus for generating a supply voltage internally within an integrated circuit comprising:
a symmetrical pump charge stage connected to an input node; and
a plurality of independently controlled symmetrical charge pump stages cascade-connected in series comprising:
a first independently controlled symmetrical pump charge stage connected to said symmetrical pump charge stage; and
a last independently controlled symmetrical pump charge stage connected to an output node;
wherein each of said independently controlled symmetrical charge stages further comprises a first independently controlled substructure and a second independently controlled substructure, each said independently controlled substructure having:
an input control node;
a pumping capacitor connected to a pumping node;
a first PMOS device connected between said input control node and said pumping node, said first PMOS device configured to electrically communicate with said pumping capacitor, wherein said first PMOS device is configured to connect said pumping node to said input control node when said pumping capacitor is not boosted;
a second PMOS device connected between an output control node and said pumping node, said second PMOS device configured to electrically communicate with said pumping capacitor, said second PMOS device configured to transfer electrical current from said pumping node to said output control node when said pumping capacitor is boosted, said second PMOS device configured to prevent reverse current feedback from said output control node to said pumping node when said pumping capacitor is not boosted; said second PMOS device having a gate terminal connected to a pumping node of another charge pump stage of a symmetrical charge pump, wherein said second PMOS device is configured to prevent a reverse current feedback from said output node to said pumping node when said pumping capacitor is not boosted; and
a third PMOS device configured to electrically communicate with said first PMOS device, wherein said third PMOS device is configured to connect said pumping node to a gate terminal of said second device to prevent the reversal current feedback from said pumping node to said input control node when said pumping capacitor is boosted; wherein said third PMOS device has a gate terminal at which is provided a control signal for independently controlling said third PMOS device.

16. The apparatus of claim 15 further comprising:
at least one intermediate independently controlled symmetrical pump charge stage between the first symmetrical pump charge stage connected to the input node and the last symmetrical pump charge stage connected to the output node.

* * * * *